US007234755B1

(12) United States Patent
Senn

(10) Patent No.: US 7,234,755 B1
(45) Date of Patent: Jun. 26, 2007

(54) CARGO CONTAINER DOOR LOCK ASSEMBLY

(75) Inventor: Brian A. Senn, South Milwaukee, WI (US)

(73) Assignee: Powerbrace Corporation, Kenosha, WI (US)

( * ) Notice: Subject to any disclaimer, the term of this patent is extended or adjusted under 35 U.S.C. 154(b) by 0 days.

(21) Appl. No.: 11/445,438

(22) Filed: Jun. 1, 2006

(51) Int. Cl.
*B60J 5/10* (2006.01)
*E05C 1/06* (2006.01)

(52) U.S. Cl. ............................ 296/146.1; 292/DIG. 4; 292/DIG. 32

(58) Field of Classification Search ............ 296/146.1; 49/394, 501, 503; 70/77, 91, 101, 106; 292/175, 292/254, 255, 341.15, DIG. 4, DIG. 32; 220/1.5
See application file for complete search history.

(56) References Cited

U.S. PATENT DOCUMENTS

| | | | | | |
|---|---|---|---|---|---|
| 245,786 | A | * | 8/1881 | Cantllivre | 292/254 |
| 462,658 | A | * | 11/1891 | Baier | 292/254 |
| 1,842,286 | A | | 1/1932 | Potter | |
| 2,169,692 | A | | 8/1939 | Hansen | |
| 2,556,361 | A | | 6/1951 | Coleman | |
| 3,181,903 | A | | 5/1965 | Olander | |
| 3,334,933 | A | | 8/1967 | Ehlers | |
| 3,601,453 | A | * | 8/1971 | Silverman | 303/89 |
| 3,614,147 | A | * | 10/1971 | Spector | 292/254 |
| 3,736,016 | A | | 5/1973 | Garvey et al. | |
| 3,950,018 | A | * | 4/1976 | Pickering | 292/144 |
| 4,307,904 | A | | 12/1981 | Daus | |
| 5,029,909 | A | | 7/1991 | Bunger | |
| 5,216,906 | A | | 6/1993 | Kurrasch | |
| 6,092,404 | A | | 7/2000 | Chhatwal | |
| 6,782,724 | B2 | * | 8/2004 | Kelly | 70/100 |
| 6,848,729 | B2 | * | 2/2005 | Caspi et al. | 292/341.16 |
| 6,923,028 | B2 | * | 8/2005 | Caldwell et al. | 70/56 |

OTHER PUBLICATIONS

Security Solutions for Transportation and Material Management; Radio Frequency Door Lock with Telematic Interface; undated; 2 pages; Mi-Jack Systems & Technology, L.L.C.

* cited by examiner

*Primary Examiner*—D. Glenn Dayoan
*Assistant Examiner*—Paul Chenevert
(74) *Attorney, Agent, or Firm*—John W. Harbst

(57) ABSTRACT

A cargo container door lock assembly including a resiliently biased door locking member movable between locked and unlocked conditions and adapted to be mounted to an interior surface of a cargo door on a cargo container including a rigid door frame. The door frame defines an opening configured to receive and accommodate a portion of the door locking member when the cargo container door is moved into a closed position. The opening in the door frame has a closed margin which interengages with the door locking member, when the cargo door is moved to a closed position, to prevent movement of the cargo door toward an open position. With the cargo container door in the closed position, the resiliently biased door locking member is accessible to being moved into an unlocked condition, thus allowing said cargo door to be moved to the open position, only from an underside of the door locking member. As such, and when the cargo container is placed on the ground or on a railcar, access to the door locking member is prevented and the door cannot be opened using normal door opening procedures.

24 Claims, 7 Drawing Sheets

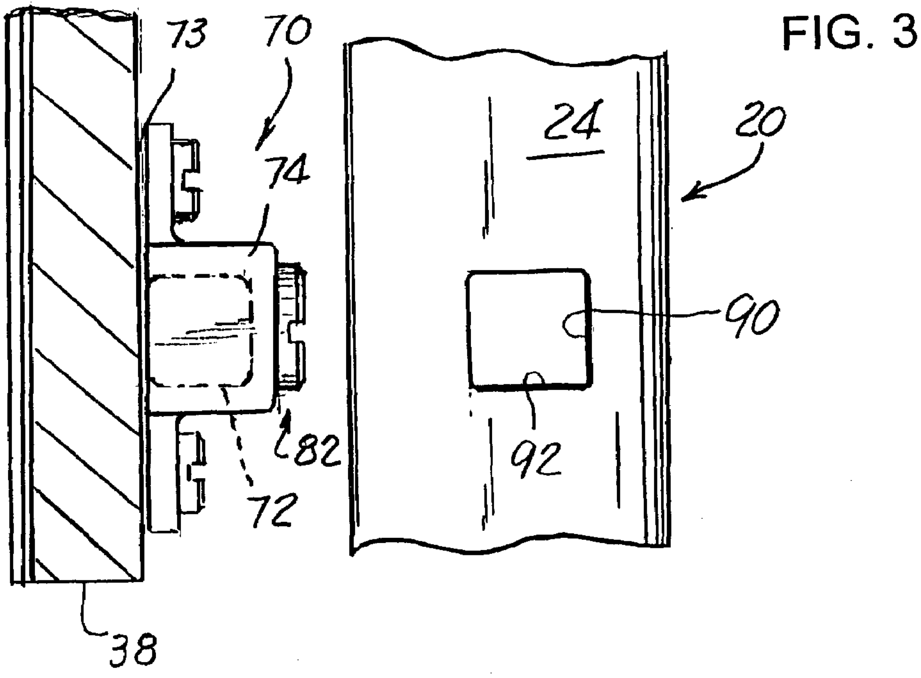
FIG. 3
FIG. 4
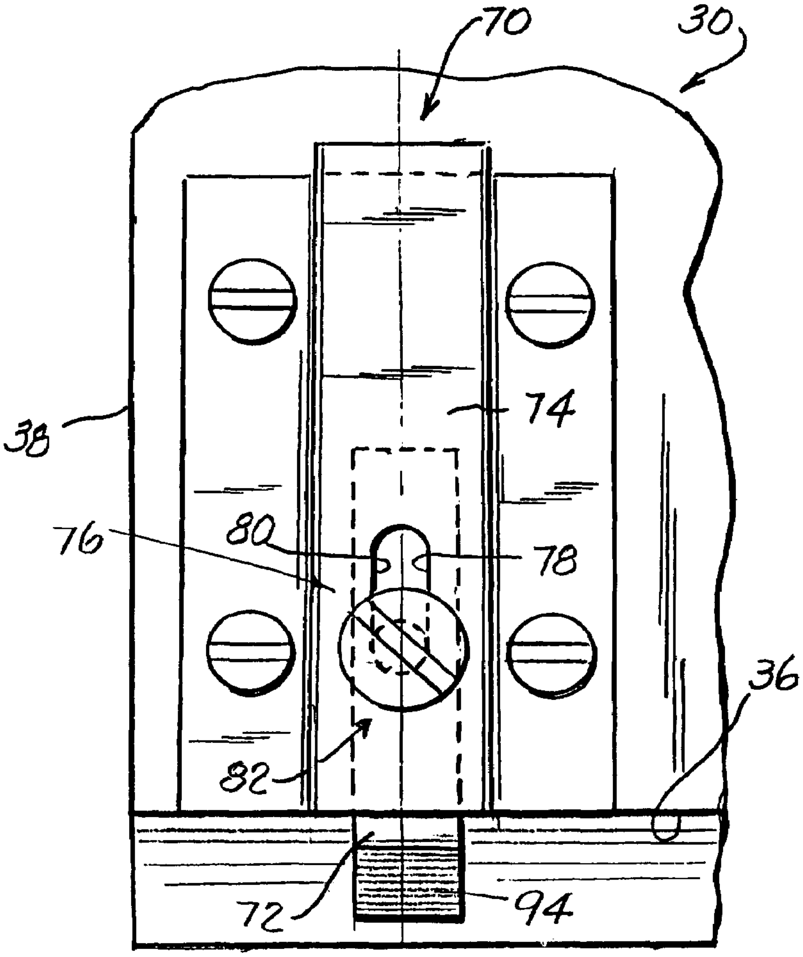

CARGO CONTAINER DOOR LOCK ASSEMBLY

FIELD OF THE INVENTION

The present invention generally relates to cargo containers having a swing-out door movable between open and closed positions and, more particularly, to a cargo container door lock assembly including a locking member which is inaccessibly arranged on an interior surface of and for automatically locking the swing-out door.

BACKGROUND OF THE INVENTION

Intermodal cargo containers provide an economic mode for transporting large quantities of cargo or goods between distant locations. Such containers are stacked on ships, carried on railcars, and are typically delivered to a specific location on a semi-trailer. The United States freight transportation network commonly uses cargo or freight containers to move a staggering volume of goods each year. In 2001, an estimated 19 million containers entered the United States through water and land ports. In 2002, 17 billion tons of goods, worth in excess of $9.5 trillion, were moved into and around the United States. This translates into approximately 320 pounds of freight moved daily for each and every U.S. resident.

A typical freight or cargo container includes a box-like enclosure having an open end for loading and unloading goods. A pair of swing-out doors, mounted in a rigid frame of the container, serve to close the open end of the cargo container during transport. Each door is hingedly secured to the door frame along one vertical edge thereof. In many applications, an exterior of each door is provided with a vertically elongated locking rod disposed adjacent to a vertical side of the door opposite from the hinged side. Rotation of the locking rod about a generally vertical axis allows the locking rod to cooperate with other conventional instrumentalities on the door frame to secure the respective container door in a closed position.

Coupled with this immense volume of goods being shipped is the exposure to enormous risks. One of the most prevalent and so called “victimless” crimes involves cargo theft. Worldwide industry theft losses for cargo in 1995 were approximated at $470 billion. Between hijackings and internal fraud, the costs to business has reached epidemic proportions. As a consequence, insurance premiums and deductibles are rising at an alarming rate. While insurance payouts can replace such stolen goods, the loss of business from clients forced to buy replacement goods might never be replaced. Even though enforcement agencies have begun forming task forces to deal with cargo theft problems, most of their responses have been reactive rather than proactive. Accordingly, law enforcement agencies and private industry have realized they must work together to find a solution to the problem of cargo theft.

Heretofore, a very basic procedure at inhibiting cargo theft involves locking the doors on the cargo containers. In one form, the locking rods on the doors of the cargo container are configured to permit a padlock or other suitable locking device to be arranged on the outside of the container to prevent rotation of the locking rod. Of course, if the locking rod cannot be rotated, opening of the doors is prevented.

External locking of cargo containers, however, has not provided adequate protection. After removing such cargo containers from the ships, they are often placed upon the ground in remote storage areas prior to being loaded on trucks or railcars. The remoteness of such cargo container storage presents a prime opportunity for cargo theft. Another prime opportunity for cargo theft is when a railcar carrying cargo containers is parked on a secluded siding or switching yard. Such areas are vulnerable to having conventional padlocks arranged in the exterior of the container being cut or otherwise removed without drawing particular attention to such acts. Furthermore, if a theft of cargo does occur in either a storage area, secluded siding or switching yard, it is possible for such theft not to be discovered for an extended time period.

Thus, there is a need and continuing desire for a cargo door lock assembly which prevents the container doors from being opened when the cargo container is on a railcar or on the ground.

SUMMARY OF THE INVENTION

In view of the above, and in accordance with one aspect, there is provided a cargo container door lock assembly including a resiliently biased door locking member movable between locked and unlocked conditions. Advantageously, the door locking member is adapted to be mounted to an interior surface of a cargo door on a cargo container including a rigid door frame. The door frame defines an opening configured to receive and accommodate a lengthwise portion of the door locking member when the door is moved into a closed position. The opening in the door frame has a closed margin which interengages with the door locking member, when the cargo door is moved to a closed position, to prevent movement of the cargo door toward an open position. With the cargo door in the closed position, the resiliently biased door locking member is accessible to being moved into an unlocked condition, thus allowing said cargo door to be moved to the open position, only from an underside of the door locking member. As such, and when the cargo container is placed on the ground or on a railcar, access to the door locking member is prevented and the door cannot be opened using normal door opening procedures.

Preferably, the cargo container door lock assembly further includes an actuator carried beneath the underside of and for moving the door locking member to an unlocked condition while the cargo door remains in a closed position. In one form, the door lock assembly actuator includes a selectively operated solenoid.

In one form, the cargo container door lock assembly further includes a flanged mounting bracket for accommodating the door locking member for generally linear sliding movement along a generally vertical path of movement. In this form, the flanged mounting bracket and the door locking member have cooperating instrumentalities for limiting linear travel of the door locking member relative to the mounting bracket. Preferably, a spring is arranged in operable combination with the mounting bracket to resiliently urge the door locking member toward a predetermined disposition. To facilitate retracting movement of the door locking member as the door is moved to a closed position, the door locking member is preferably configured with a camming head at a free end thereof.

In accordance with another aspect, there is provided a cargo container door lock assembly including a slam latch adapted to be mounted to an interior surface of a movable cargo door, with a lower portion of the slam latch projecting beyond a lower edge of the cargo door, as long as cargo door is an open position. The slam latch is vertically movable to allow the cargo door to move to a closed position. The cargo door is mounted on a cargo container with a rigid door frame having a series of rigidly interconnected members including a hollow sill defining an opening configured to receive a lengthwise portion of the slam latch when the door is moved into the closed position. The opening, defined by the door frame sill, has a closed margin which, when the cargo door is in the closed position, interengages with the slam latch to prevent the cargo door from being moved toward the open position. The slam latch is accessible to being removed from the opening defined by the door frame sill, thus allowing the cargo door to be moved to an open position, only from an underside of the slam latch. Accordingly, and as long as the cargo container is either on the ground or on a railroad car, the slam latch remains interengaged with the closed margin of the opening in the door frame sill to prevent movement of the cargo door toward an open position using normal door opening procedures.

In a preferred embodiment, the cargo container door lock assembly further includes an actuator carried by the hollow frame sill beneath the underside of and for moving the slam latch to an unlocked condition while the cargo door remains in a closed position. In one form, such an actuator includes a selectively operated solenoid.

Preferably, the cargo container door lock assembly further includes a flanged mounting bracket for accommodating the slam latch for generally linear sliding movement along a generally vertical path of movement. In this embodiment of cargo container door lock assembly, the flanged mounting bracket and slam latch have cooperating instrumentalities for limiting linear travel of the slam latch relative to the mounting bracket. A spring is preferably arranged in operable combination with the mounting bracket to urge the slam latch toward a predetermined disposition. To promote retracting movement of the slam latch as the door is moved to a closed position, the slam latch is preferably configured with a camming head at a free end thereof.

In accordance with another aspect, there is provided a cargo container door lock assembly including an elongated hollow housing adapted to be mounted to an interior surface of a cargo door adjacent a first side door edge disposed opposite from and generally parallel to a second vertical side edge hingedly connected to a door frame on the cargo container. The cargo container door frame includes a series of rigidly interconnected frame members including a generally horizontal hollow sill. An elongated locking bolt is mounted for endwise reciprocatory movement between locked and unlocked conditions within the hollow housing. A portion of the locking bolt extends beyond a lower edge of the cargo door when the cargo door is in an open position. The hollow sill of the door frame defines an opening having a closed margin. The opening is arranged to receive and accommodate a section of the locking bolt after the cargo door is in the closed position. A closed margin of the opening in the door frame sill interengages with the door locking member to prevent the door from being moved toward the open position. The door lock assembly is configured such that the locking bolt is accessible to being removed from the opening defined by the door frame sill, thus allowing said cargo door to be moved to an open position, only from an underside of the locking bolt. As such, and as long as the cargo container is either on the ground or on a railroad car, a lengthwise portion of the locking bolt remains interengaged with the closed margin of the opening in the door frame sill so as to prevent movement of the cargo door toward an open position using normal door opening procedures.

In a preferred form, the cargo container door lock assembly further includes an actuator carried by the hollow sill beneath the underside of and for moving the locking bolt to an unlocked condition while the cargo door remains in a closed position. In one form, the actuator for the locking bolt includes a selectively operated solenoid.

In a preferred embodiment, the flanged mounting bracket and the locking bolt have cooperating instrumentalities for limiting linear travel of the locking bolt relative to the mounting bracket. A spring is preferably arranged in operable combination with the mounting bracket to urge the locking bolt toward a predetermined disposition. Moreover, and to promote retracting movement of the locking bolt toward a position whereby allowing the door to close, the locking bolt is preferably configured with a camming head at that end portion extending beyond a lower edge of the cargo door when the cargo door is in an open position.

A primary feature of this invention relates to providing a door locking mechanism for preventing unauthorized opening of a door on a cargo container as long as the cargo container is either on the ground or on a railcar.

Another feature of this invention relates to providing a protective apparatus for securing a cargo container door on an interior surface thereof to reduce cargo theft.

Another feature of this invention relates to providing a protective apparatus for securing a cargo container door using a simplified lock design which is easily manufactured, installed and maintained.

These and other features, aims and advantages of the present invention will become more readily apparent from the following detailed description, appended claims and drawings.

DESCRIPTION OF THE DRAWINGS

FIG. 3 is a top plan view of one form of a cargo container door locking assembly of the present invention;

FIG. 4 is an elevational view of the cargo container door locking assembly shown in FIG. 3;

DESCRIPTION OF THE INVENTION

Figure 1:
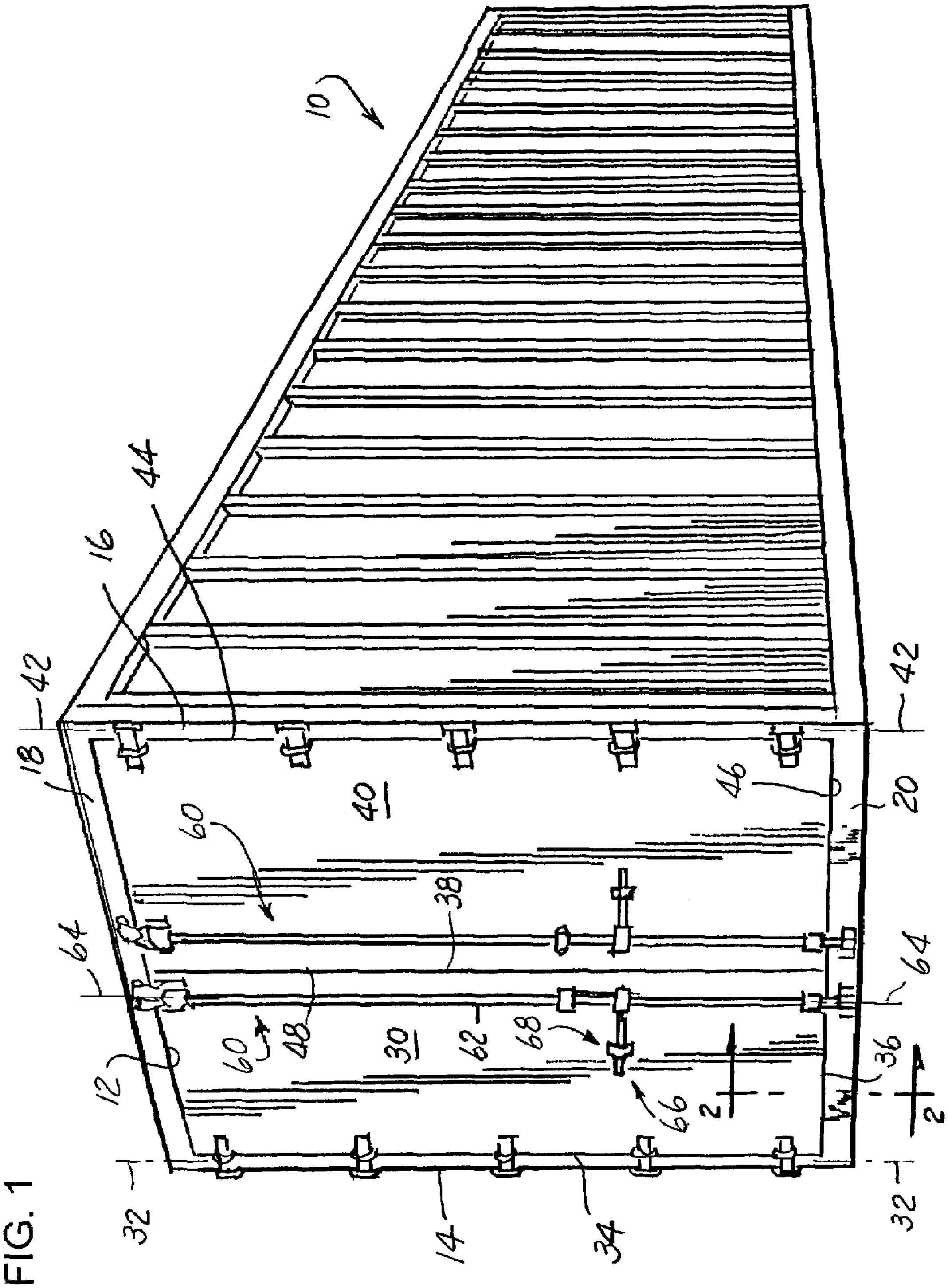
FIG. 1 is a right top perspective view of one form of a cargo container embodying principals of the present invention.

While the present invention is susceptible of embodiment in multiple forms, there is shown in the drawings and will hereinafter be described preferred embodiments of the invention, with the understanding the present disclosure is to be considered as setting forth exemplifications of the invention which are not intended to limit the invention to the specific embodiments illustrated and described.

Referring now to the drawings, wherein like reference numerals indicate like parts throughout the several views, in FIG. 1 there is shown a non-limiting example of a conventional intermodal cargo or freight container, indicated generally by reference numeral 10, which embodies a door lock assembly according to the present invention. At one end, container 10 defines an enlarged cargo storage opening 12 for permitting access to an interior of the container 10. A series of frame members, including a pair of laterally spaced side members 14 and 16 rigidly joined to a horizontally elongated header 18 and a horizontally elongated sill 20, frame the opening 12. In the example shown in FIG. 2, sill 20 has a hollow configuration and defines a cavity 22 between horizontally elongated upper and lower sill surfaces 24 and 26, respectively.

In the illustrated example, access to the interior of the cargo container 10 can be provided by a pair of conventional side-by-side swing-out container doors 30 and 40. It should be appreciated, however, the door lock assembly of the present invention is equally applicable to cargo containers having one or more hinged doors mounted elsewhere on the container 10.

Figure 2:
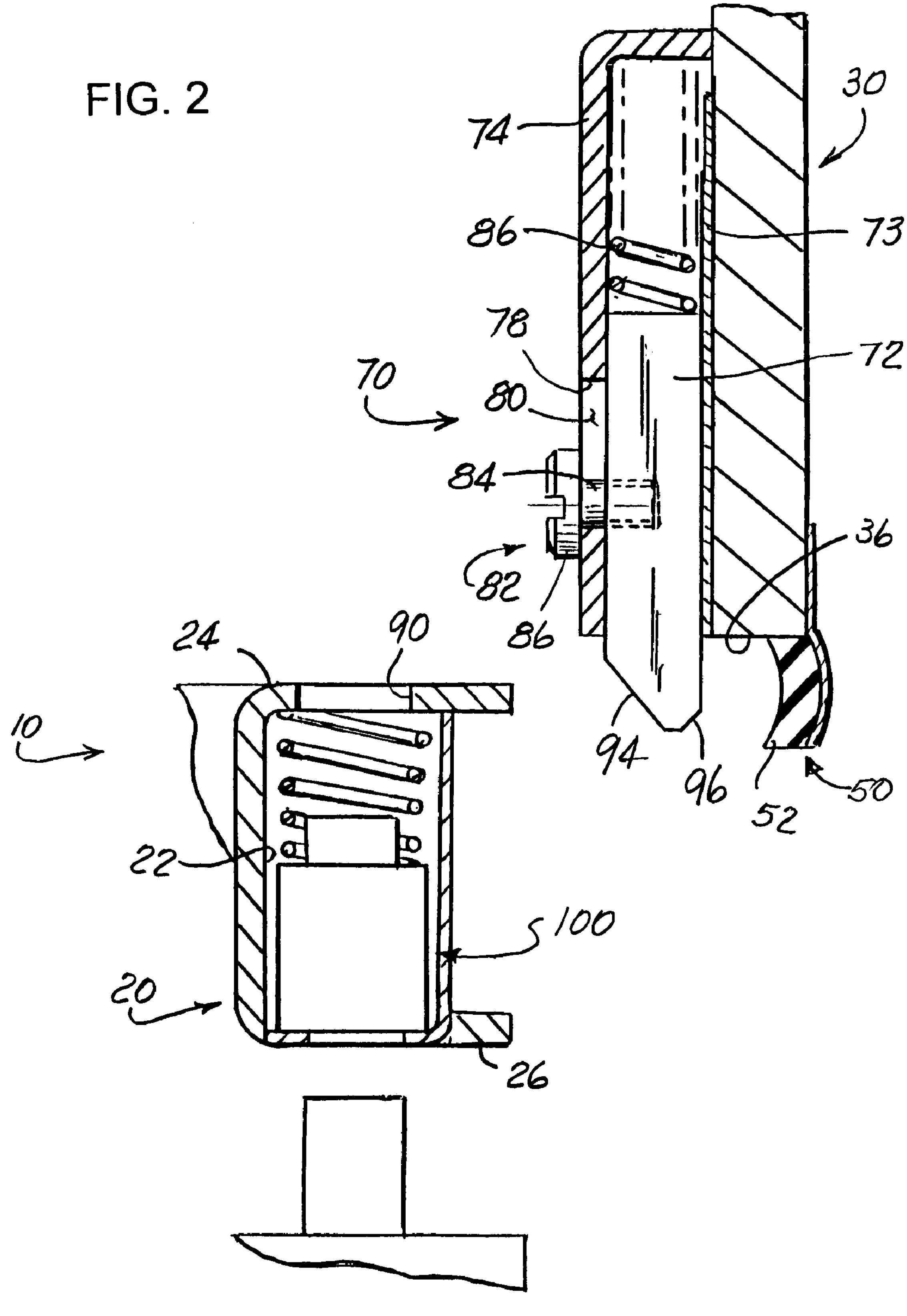
FIG. 2 is a sectional view taken along line 2—2 of FIG. 1.

As shown in FIG. 1, swing-out door 30 is preferably supported and connected about a vertical axis 32 adjacent one vertical door edge 34 so as to allow door 30 to move between open and closed positions. As shown in FIGS. 1 and 2, door 30 further includes a generally horizontal lower edge 36 arranged in vertically spaced relation relative to the upper sill surface 24.

Similarly, and as shown in FIG. 1, swing-out door 40 is preferably supported and connected about a vertical axis 42 adjacent one vertical door edge 44 so as to allow door 40 to move between open and closed positions. Door 40 further includes a generally horizontal lower edge 46 (FIG. 1) arranged in vertically spaced relation relative to the upper sill surface 24.

Preferably, and as shown in FIG. 2, the doors 30, 40 are furthermore preferably provided with conventional seal structure 50. The seal structure 50 on doors 30, 40 is substantially similar and, thus, only the seal structure associated with door 30 will be discussed in detail. As shown in FIG. 2, seal structure 50 includes a compressible material 52, such as rubber or the like, arranged in depending relation from the lower edge of each door 30, 40. As will be appreciated, when the swing-out doors 30, 40 are in a closed position, seal structure 50 combines with the sill 20 to inhibit debris and moisture for passing between the lower edge of the swing out doors and the upper sill surface 24. Of course, and as known, other peripheral edges of each door 30, 40 can likewise be provided with seal structure to further inhibit contaminants and moisture from passing between the doors and the frame members 14, 16, 18 and 20 on container 10.

In the embodiment illustrated in FIG. 1, vertical edge 38 of door 30 is arranged in a conventional and well known fashion relative to the vertical edge 48 of door 40 such that door 30 is required to be manually opened before door 40 is permitted to be moved from a closed position toward an open position. Suffice it to say, one the doors 30, 40 providing access to the interior of container 10 is required to be moved from a closed position toward an open position before the other door can be moved from a closed position toward an open position but the particular order of door opening is not of importance to the present invention.

As shown in FIG. 1, conventional door locking hardware 60 is mounted on each door 30, 40 for locking the doors 30, 40 in a closed position from outside or on the exterior of the container 10. In the illustrated embodiment, the door locking hardware 60 on the exterior of each door 30, 40 is substantially similar to each other. In the embodiment shown, the door locking hardware 60 includes a vertically elongated locking rod 62 mounted to an exterior of each door 30, 40 for rocking movements about a fixed axis 64. As known, an upper end of each locking rod 62 is suitably configured to operate in combination with a conventional keeper (not shown) on the frame header 18. As known, a lower end of each locking rod 62 is also configured to operate in combination with a conventional keeper (not shown) on the horizontal sill 20.

Intermediate opposed ends, each locking rod 62 is furthermore customarily provided with handle structure 66 radially extending from axis 64 for rotating the locking rod 62 about axis 64. As will be appreciated, rotation of the locking rod 62 causes the upper and lower ends thereof to move into and out of operable combination with the keepers on the header 18 and sill 20 to lock and unlock the respective doors 30, 40 from an exterior of the container 10. In one form, handle structure 66 further includes conventional and well known structure 68 for preventing rotational movement of the locking rod 62 about axis 64 while permitting the doors 30, 40 to be secured, as with a pad lock or the like, in a closed position from an exterior of the container 10.

In accordance with the present invention, and as shown in FIG. 2, a door lock assembly 70 is adapted to be mounted to an interior surface of at least one of the cargo container doors 30, 40 for securely locking the doors 30, 40 from inside the container 10 each time the doors 30, 40 are closed. In a preferred embodiment, the door lock assembly 70 is mounted to an interior surface of that rear cargo container door which must be opened first before allowing the other rear cargo container door to be moved toward an open position. In the illustrated embodiment, wherein door 30 must be first opened before allowing door 40 to be moved toward an open position, the door lock assembly 70 is mounted to an interior surface of door 30.

Figure 6:
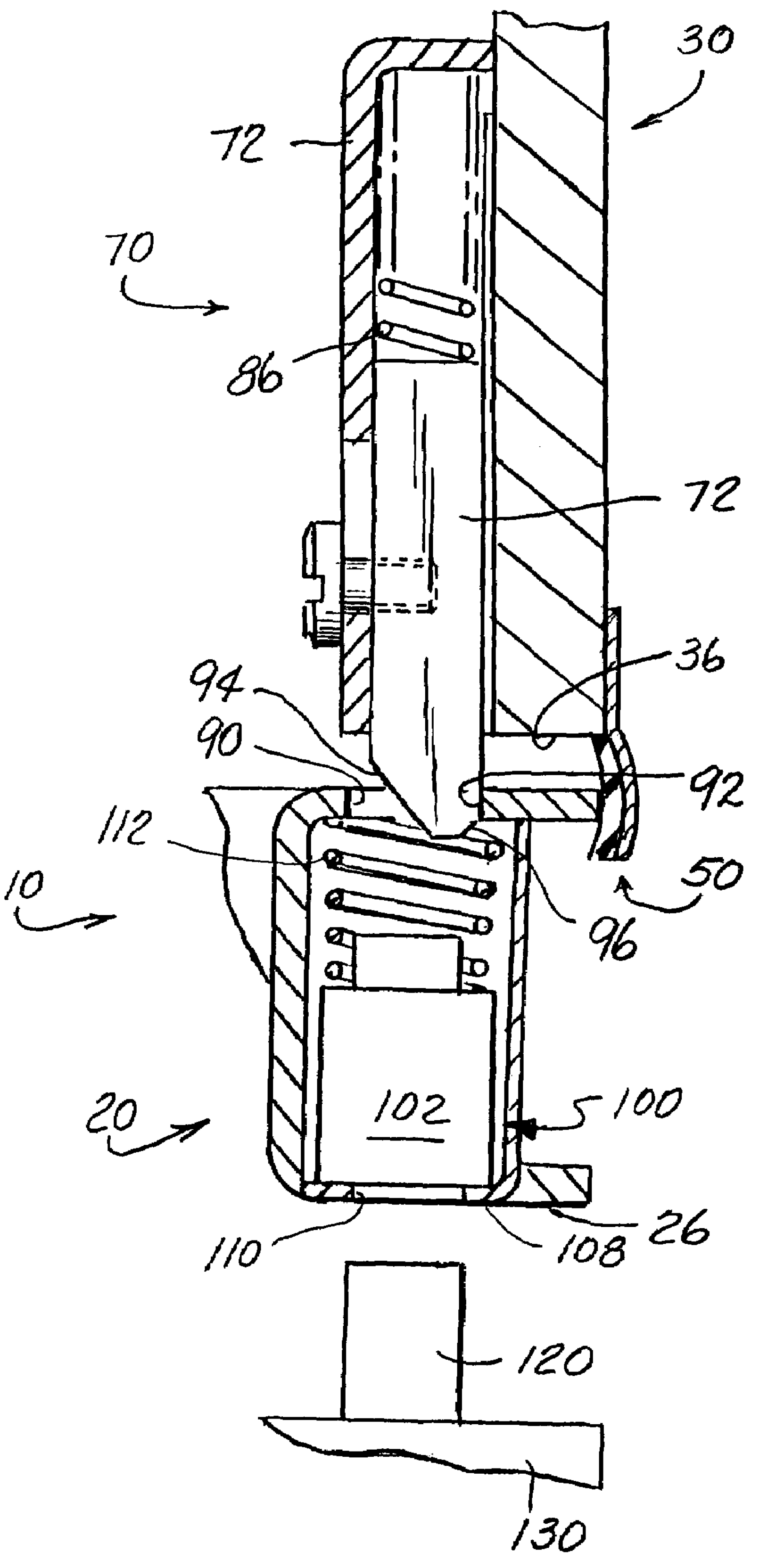
FIG. 6 is a view similar to FIG. 5 but showing the container door in a closed position.

Door lock assembly 70 includes a door locking member or slam-latch 72 vertically movable between an unlocked condition (FIG. 2) and a locked condition (FIG. 6). Preferably, a flanged mounting bracket or housing 74 accommodates the door locking member 72 for endwise linear reciprocatory sliding movement. As shown in FIG. 3, housing 74 is mounted to an interior surface of the cargo container door 30 adjacent vertical door edge 38 disposed opposite from the door edge 34 (FIG. 1) hingedly connected to the door frame. To facilitate vertical sliding movement of the slam-latch 72, a suitably configured strip or layer of material 73, i.e. NYLON or the like, having a low coefficient of friction, is preferably provided between the slam-latch 72 and the interior surface of the swing-out container door on which the slam-latch 72 is mounted.

Preferably, the locking bolt 72 is resiliently biased such that a lower lengthwise portion of the locking bolt 72 extends beyond the lower edge 36 of the door on which the locking bolt 72 is mounted as long as the cargo container door on which the locking bolt 72 is mounted is in an open position. In this regard, the locking bolt 72 and mounting bracket or housing 74 have cooperating instrumentalities 76 for limiting downward linear displacement of the locking bolt 72 relative to the lower edge 36 of the door on which the locking bolt 72 is mounted.

In the embodiment illustrated in FIG. 4, the mounting bracket or housing 74 defines a vertically elongated slot or opening 78 having a closed margin 80. Returning to FIG. 2, a suitable fastener 82, having a shank portion 84 and head portion 86, is arranged in operable combination with the locking bolt 72. The shank portion 84 of fastener 82 radially extends through the slot 78 and the head portion 86 of fastener 82 facilitates vertically guided movement of the locking bolt 72 within the housing 74. As will be appreciated, a lower end of the slot 78 cooperates with the shank portion 84 of fastener 82 to define a lower limit stop for the locking bolt 72. Moreover, an upper end of the slot 78 cooperates with the shank portion 84 of fastener 82 to define an upper limit stop for the locking bolt 72.

Preferably, a suitable spring 86 is operably disposed between the locking bolt 72 and housing 74 so as to resiliently and positively bias the locking bolt 72 toward the position shown in FIG. 2. As shown, spring 86 biases the locking bolt 72 downwardly while allowing for vertical movement of the locking bolt 72 to a retracted position (FIG. 5) so as to allow the container door 30 to be moved into a closed position.

As shown in FIGS. 2 and 3, the hollow sill 20 of the door frame defines an opening 90 configured to receive and accommodate a lower lengthwise portion of the locking bolt 72 when the door 30 is arranged in a closed position. Preferably, opening 90 defines a closed margin 92 which interengages with the locking bolt 72 after the door 30 is in a closed position thereby preventing the door 30 from being moved toward an open position until after the locking bolt 72 is removed from interengagement with the closed margin 92 of the opening 90 defined by sill 20.

As shown in FIG. 2, a lower free end of the locking bolt or slam-latch 72 preferably has a camming head configuration to facilitate vertical displacement of the slam latch 72 as the door 30 is moved toward a closed position. In the embodiment illustrated in FIGS. 2, 4 and 5, the lower free end of the slam-latch 72 is provided with a vertically slanted camming surface 94 disposed on that surface of the slam latch 72 arranged the farthest distance from the interior surface of door 30. As will be appreciated, the camming surface 94 on the slam-latch 72 is configured to engage and cooperate with the horizontal sill 20, as door 30 moves toward a closed position, to raise the slam-latch 72 against the biasing action of spring 86.

Once the door reaches a fully closed position, as shown in FIG. 6, spring 86 serves to forcibly and automatically urge the slam-latch 72 into the opening 90 defined by sill 20 thereby locking door 30 in a closed position from inside of the cargo container 10. As shown in FIGS. 2, 4 and 6, the lower free end of the slam-latch 72 is preferably provided with a vertically slanted camming surface 96 arranged opposite from camming surface 94 for facilitating the release of the slam-latch 72 from the opening 90 in sill 20 when the door 30 is moved toward an open position.

Returning to FIG. 2, door lock assembly 70 furthermore includes an actuator 100 for vertically moving the locking bolt 72 to an unlocked condition while the cargo container door 30 remains in a closed position. Suffice it to say, the purpose of actuator 100 is to disengage the locking bolt 72 from operative engagement with the opening 90 in the sill 20 only after the container 10 is disposed in a predetermined position. As will be appreciated by those skilled in the art, the actuator 100 can take a myriad of different forms without detracting or departing from the spirit and scope of the present invention.

Figure 5:
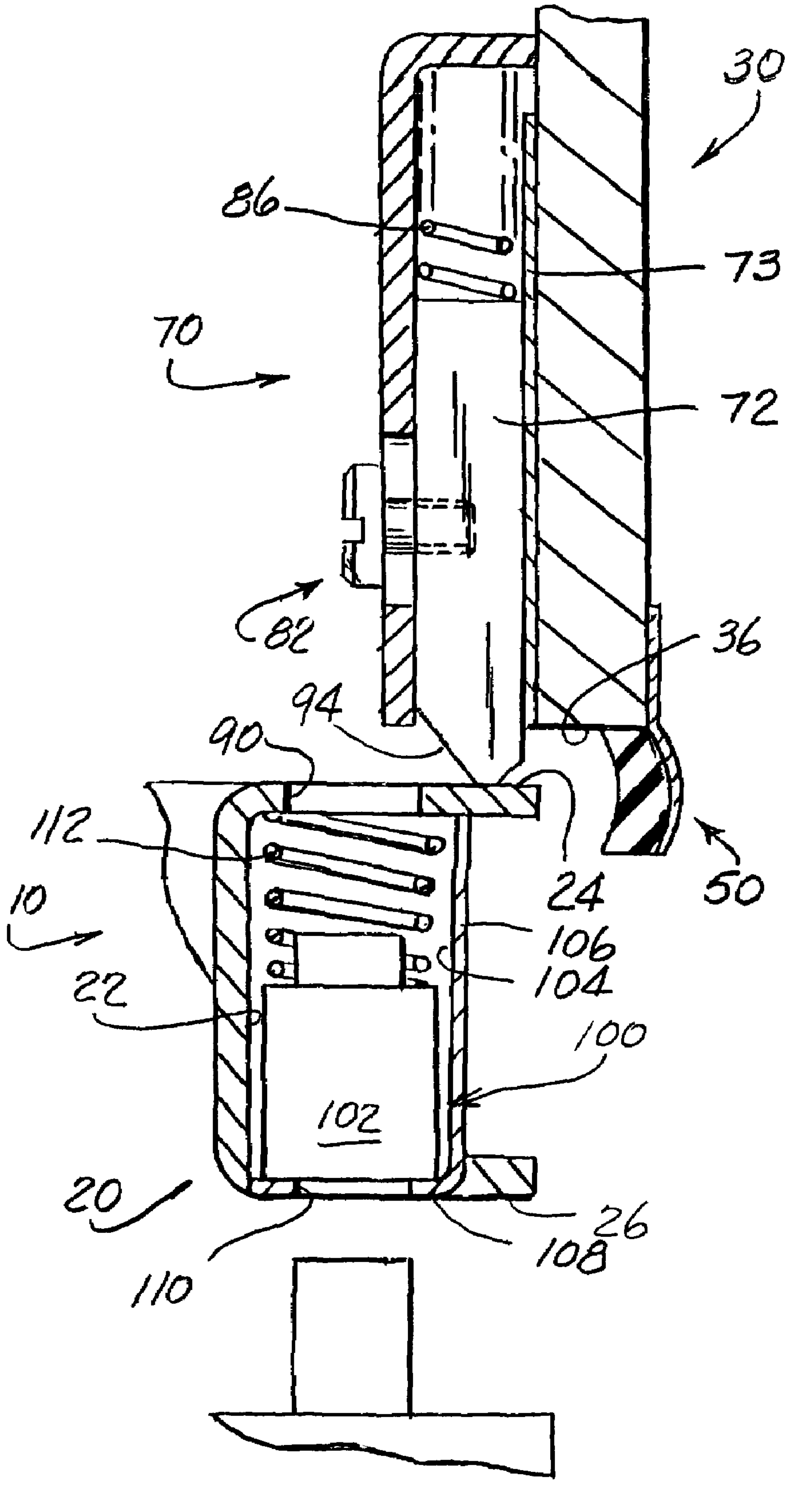
FIG. 5 is a view similar to FIG. 2 but showing the container door being moved toward a closed position.

In the form shown in FIG. 5, actuator 100 includes a member or plunger 102 mounted for vertical sliding reciprocatory movement within a cavity 104 defined by a housing 106 securely mounted within the cavity 22 defined by sill 20. Preferably, plunger 102 is mounted for movement directly beneath the opening 90 defined by sill 20. Housing 106 serves multiple purposes. First, housing 106 serves as a vertical guide for member 102. Second, housing 106 inhibits contaminants from interfering with proper operation of member 102. Moreover, securement of housing 106 to the sill 20 inhibits access to member 102 from outside of the housing 106. Notably, when container door 30 is closed, member 102, in combination with housing 106, prevents access to an underside of the locking member 72 from outside of the container 10 except from beneath or from an underside of the sill 20. In a most preferred form, housing 106 is secured to the sill 20 in a manner preventing unwarranted removal of either plunger 102 or housing 106 from the sill 20.

In the embodiment shown in FIG. 5, housing 106 defines a generally horizontal base 108. In the exemplary embodiment, housing 106 defines a bore 110 which passes through the base 108 and opens to an underside of member 102. The weight of member 102 keeps it biased downward toward the base 108 of housing 106. In the illustrated example, a suitably configured spring 112 positively urges or resiliently biases member 102 toward the base 108 and toward a retracted position wherein member 102 is vertically retracted or removed from operative engagement with the free end of locking bolt 72. Preferably, an upper end of member 102 is configured to allow for at least partial endwise passing of member 102 through the opening 90 in the sill 20 while preventing member 102 from being pushed above the upper sill surface 24 to inhibit damage to member 102 from tines on a fork truck or the like.

Figure 7:
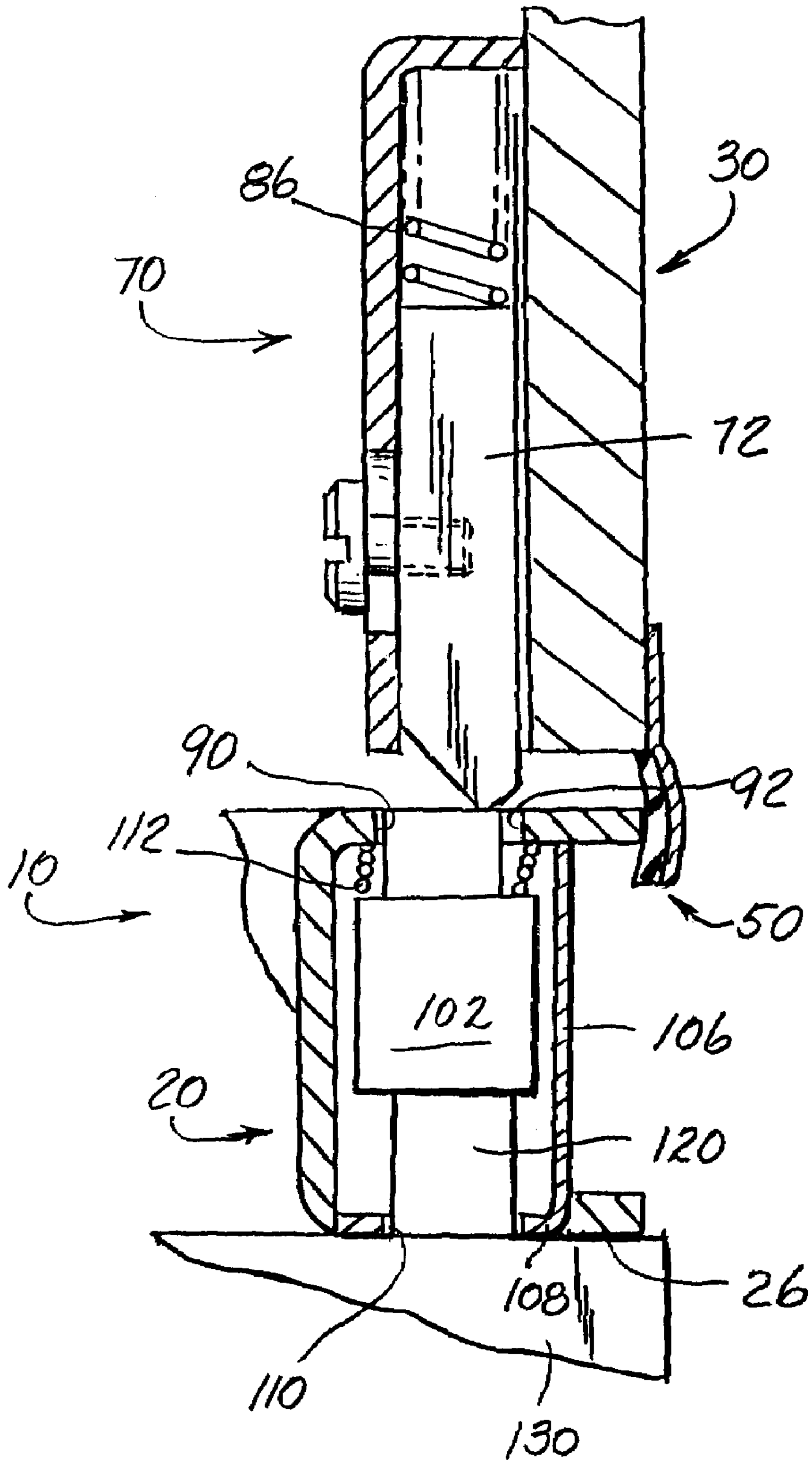
FIG. 7 is a view similar to FIG. 6 but showing release of the door locking assembly after the cargo container is disposed in a predetermined position.

Actuator 100 of door lock assembly 70 can be enabled using several different methodologies. In the embodiment shown by way of example in FIGS. 6 and 7, a suitably shaped upright protrusion 120 is provided on the chassis of a trailer 130 wherein container 10 is to be loaded for transport. As shown, and after positioning the container 10 relative to the trailer 130, the upright protrusion 120 is specifically designed to fit endwise through the bore or opening 110 in the base 108 of housing 106 whereby forcibly urging the plunger 102 upward against the action of the spring 86 so as to remove the locking bolt 72 from operative engagement with the closed margin 92 of the bore 90 defined by sill 20. As such, and only after the cargo container 10 is disposed in a predetermined position (relative to the trailer 130), will the door lock assembly 70 be conditioned to permit the container door 30 to be moved toward an open position thereby permitting access to the cargo within container 10. Alternatively, a manually operated pivotal lever or linkage arrangement can be provided on the trailer 130 for vertically engaging moving the actuator 100 from an underside of or beneath the container sill 20.

Figure 8:
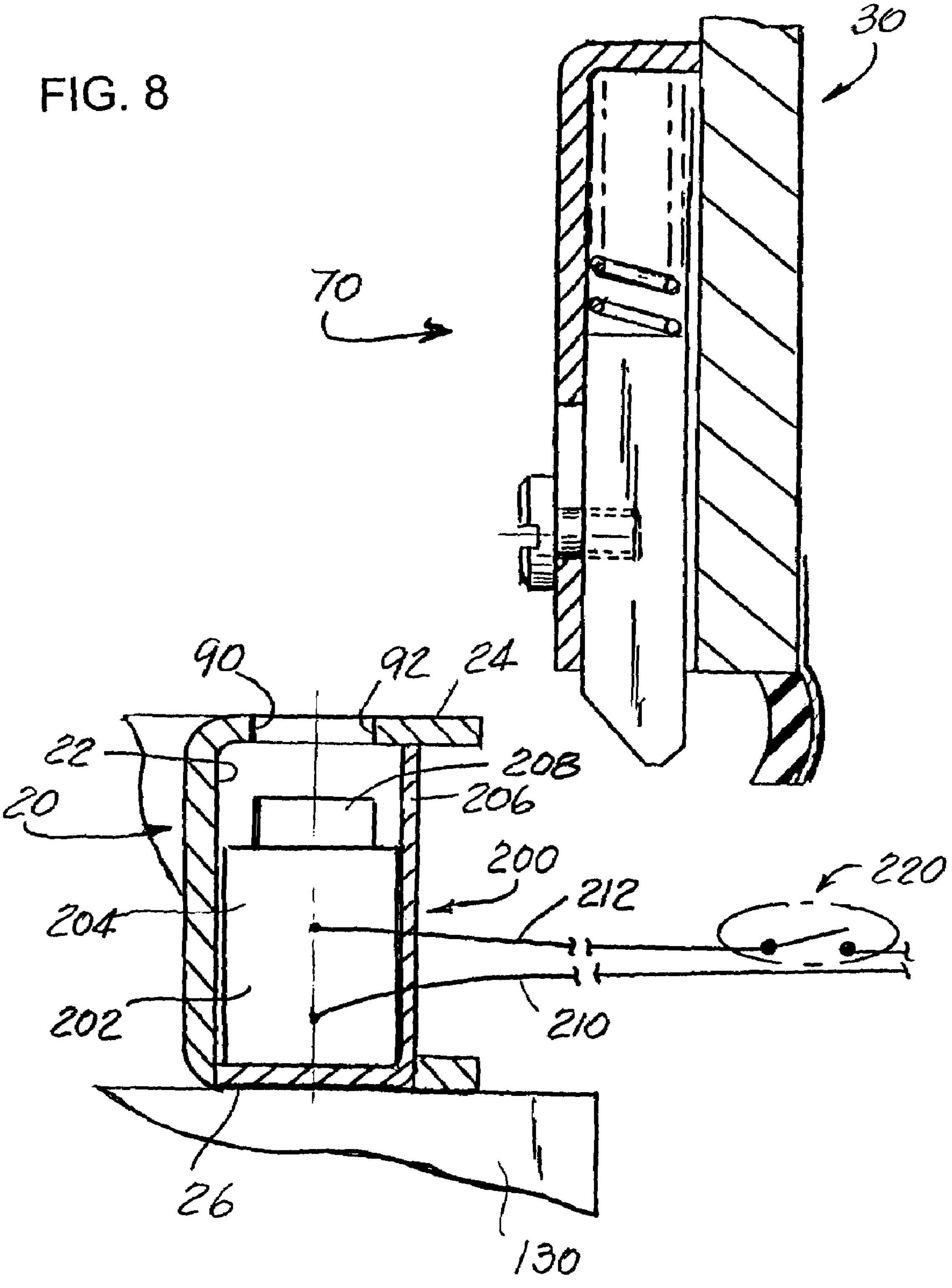
FIG. 8 is a view similar to FIG. 2 but showing an alternative embodiment of the present invention.

Alternatively, and in the embodiment shown in FIG. 8, the actuator for vertically moving the locking bolt 72 of lock assembly 70 to an unlocked condition while the cargo container door 30 remains in a closed position is indicated generally by reference numeral 200. The elements of this alternative actuator 200 that are functionally analogous to the those components discussed above regarding actuator 100 are designated by similar reference numerals in the 200 series while other components identical to those discussed above will have identical reference numerals.

The actuator 200 shown in FIG. 8 is in the form of an electrically operated apparatus 202 such as a conventional electrically operated solenoid or the like. Apparatus 202 includes an electrical casing 204 accommodated with a housing 206 secured within the cavity 22 defined by sill 20 of container 10. Apparatus 202 further includes a linearly extendable/retractable member 208 which responds to the electrical signals delivered to apparatus 202 over electrical leads 210 and 212. The electrical leads 210, 212 extending from apparatus 202 can be connected to a switch 220 on the trailer chassis 130, or to a switch in a tractor connected to the trailer chassis, or to some form of remote control apparatus for controlling operation of apparatus 202 and, thus, controlling, the condition of lock assembly 70 on the interior of the container 10.

During transport, member 208 of apparatus 202 is in a retracted position so as to allow a lengthwise portion of the locking bolt 72 of lock assembly 70 to automatically drop or pass into the opening 90 upon closure of the door 30 such that a lengthwise portion of the locking bolt 72 interengages with the closed margin 92 of opening 90 and locks the container doors 30, 40 from an interior of the container 10. As such, the doors 30, 40 cannot be moved toward an open position using the normal door opening techniques and notwithstanding the conventional locking devices on the exterior of the container 10 having been illegally broken or otherwise impaired.

After container 10 is properly positioned on the trailer chassis 130 or the like, apparatus 200 can be selectively operated to distend member 208 whereby pushing the locking bolt 72 out of engagement with the closed margin 92 of the sill opening 90 of container 10. Like plunger 102, member 208 of actuator 202 is preferably configured to allow for at least partial passing of a free or operative end of member 208 through the opening 90 in the sill 20 while preventing the remainder of member 208 from being pushed above the upper sill surface 24 to reduce the likelihood of damage to member 208 from tines on a fork truck or the like. Of course, after the doors 30, 40 are opened, apparatus 202 of actuator 200 is operated so as to return member 208 to a retracted position such that after the doors 30, 40 are returned to their closed position, the doors 30, 40 can be again automatically locked from an interior of the container 10.

The door lock assembly of the present invention permits the swing-out container doors 30, 40 to close in a typical fashion. That is, with the present invention, there are no special operational instructions required to close the container doors 30, 40. Notably, however, after the container doors 30, 40 are closed, the door lock assembly of the present invention serves to automatically lock the container doors 30, 40 from the interior of the cargo container 10. Regardless of the type of apparatus used to affect release thereof, the door lock assembly 70 of the present invention is specifically configured to permit release of the door locking member 72 only from beneath or from an underside of the door locking member 72. As such, and when container 10 is located in a predetermined position, i.e., on the ground, the bottom or lower surface 26 of the sill 20 is in engagement with the ground, thus, preventing access to the locking bolt 72 of the door lock assembly 70. As such, the cargo swing door 30 cannot be opened even after any conventional securement device on the outside of the container swing doors 30, 40 may be forcibly and illegally opened. Moreover, when the cargo container 10 is situated in a predetermined position, i.e., on a railcar, access to the underside surface 26 on the container sill 20 is prevented thus thwarting access to the locking bolt 72 of lock assembly 70 and thereby preventing unwarranted unlocking of the door lock assembly 70. As such, and until the cargo or freight container 10 is loaded onto a trailer chassis with suitable means for operating the actuator of the lock assembly, the cargo and freight carried within the enclosure of container 10 is guarded by the door lock assembly 70 arranged within the interior of the container 10.

From the foregoing, it will be observed that numerous modifications and variations can be made and effected without departing or detracting from the true spirit and novel concept of the present invention. Moreover, it will be appreciated, the present disclosure is intended to set forth an exemplification of the invention which is not intended to limit the invention to the specific embodiment illustrated. Rather, this disclosure is intended to cover by the appended claims all such modifications and variations as fall within the spirit and scope of the claims.

What is claimed is:

1. A cargo container door lock assembly for releasably locking a swinging door of a cargo container in a closed position, with said cargo container including a rigid frame with top, bottom and side frame members rigidly joined to define a generally rectangular opening which is at least partially closed when said door is in the closed position, and with the bottom frame member having upper and lower generally parallel and horizontal flanges joined to each other by a vertical flange, and with the lower flange of said bottom frame member defining a lowermost engaging surface for said container, said door lock assembly comprising:

a resiliently biased door locking member having a lower end and which is movable between locked and unlocked positions;

a bracket for mounting said door locking member to an interior surface on said swinging door for sliding movement along an axis extending generally normal to the upper flange of said bottom frame member, and with the upper and lower flanges of said bottom frame member defining upper and lower vertically spaced and generally aligned openings, respectively, and wherein the lower end of said door locking member passes through the upper opening defined by said upper flange of said bottom frame member when said swinging door is in the closed position, and with a closed margin of the upper opening defined by said upper flange preventing the door, with the resiliently biased door locking member mounted thereon, from moving toward an open position until the container is positioned to allow a protrusion to pass through the lower opening in the lower flange of the bottom frame member whereby operably moving the door locking member to the unlocked position thereby allowing the swing door to be moved toward the open position.

2. The cargo container door lock assembly according to claim 1 wherein said bracket and said door locking member have cooperating instrumentalities for limiting linear travel of said door locking member relative to said bracket between locked and unlocked positions.

3. The cargo container door lock assembly according to claim 1, wherein a spring is arranged in operable combination with and urges said door locking member toward the locked position.

4. The cargo container door lock assembly according to claim 1, wherein said door locking member has a camming head configuration toward a lower end thereof for facilitating movement of said door locking member.

5. The cargo container door lock assembly according to claim 1, further including an actuator carried by said rigid bottom frame member between said upper and lower flanges for moving said door locking member to the unlocked position in response to said protrusion passing upwardly through the lower opening in the lower flange of said bottom frame member.

6. The cargo container door lock assembly according to claim 5, further including structure for limiting access to said actuator carried between the upper and lower flanges of the bottom frame member of said door frame.

7. A cargo container door lock assembly for releasably locking a swinging door of a cargo container in a closed position, with said cargo container including a rigid frame with top frame member a hollow sill and side frame members rigidly joined to said top frame member and said sill to define a generally rectangular opening which is at least partially closed when said door is in the closed position, and with the sill having upper and lower generally parallel and horizontally extending flanges joined to each other by a vertical flange, and with the lower flange of said sill defining a lowermost engaging surface for said container, said door lock assembly comprising:

a resiliently biased slam latch adapted to be mounted to an interior surface of said door for linear endwise movement along a generally vertical path of travel between locked and unlocked positions and with a lengthwise portion of said latch projecting beyond a lower peripheral edge of said door as long as said door is in an open position, and with the upper and lower flanges of said sill defining upper and lower vertically spaced and generally aligned openings, respectively, and wherein a lengthwise portion of the lower end of said slam latch passes through the upper opening defined by said upper flange of said sill when said swinging door is in the closed position, and with a closed margin of said upper opening defined by said upper flange preventing the door with the slam latch mounted thereon from moving toward an open position until the container is positioned to allow a protrusion to pass through the lower opening in the lower flange of sill whereby operably moving the door locking member to the unlocked position thereby allowing the swing door to be moved toward the open position.

8. The cargo container door lock assembly according to claim 7, further including an actuator carried by said hollow sill between said upper and lower frame pieces for moving said slam latch to the unlocked position in response to said protrusion passing upwardly through the lower opening in said frame piece of said sill.

9. The cargo container door lock assembly according to claim 8, further including structure for limiting access to said actuator carried between the upper and lower flanges of said hollow sill.

10. The cargo container door lock assembly according to claim 7, further including a mounting bracket for accommodating said slam latch for generally linear sliding movement along the generally vertical path of travel.

11. The cargo container door lock assembly according to claim 10, wherein said mounting bracket and said slam latch have cooperating instrumentalities for limiting linear travel of said slam latch relative to said mounting bracket.

12. The cargo container door lock assembly according to claim 10, wherein a spring is arranged in operable combination with and for urging said slam latch toward the locked position.

13. The cargo container door lock assembly according to claim 10, wherein said slam latch has a camming head configuration at a free end thereof.

14. A cargo container door lock assembly for releasably locking a door of a cargo container in a closed position, with said door being connected along a first vertical door edge to a rigid frame of the cargo container for swinging movements between the closed position and an open position, with the rigid frame of said cargo container having a top frame member, a hollow sill and side frame members rigidly joined to each other by the top frame member and said sill to define a generally rectangular opening which is at least partially closed when said door is in the closed position, and with the hollow sill having upper and lower generally parallel and horizontal flanges joined to each other by a vertical flange, and with the lower flange of said sill defining a lowermost engaging surface for said container, said door lock assembly comprising:

a hollow housing adapted to be mounted to an interior surface of said door adjacent a second vertical edge thereof; and an elongated locking bolt mounted for endwise reciprocatory movement between locked and unlocked positions and within said hollow housing, with a lower end portion of said locking bolt extending beyond a lower edge of said cargo door when said cargo door is in an open position; and wherein the upper and lower flanges of said hollow sill define upper and lower vertically spaced and generally aligned openings, respectively, and with a lengthwise portion of the lower end portion of said locking bolt passing through the upper opening defined by said upper flange of said sill when said swinging door is in the closed position, and with a closed margin of said upper opening defined by the upper flange of said sill preventing the door with the locking bolt mounted thereon from moving toward an open position until the container is positioned to allow a protrusion to pass through the lower opening in the lower flange of the hollow sill whereby operably moving the locking bolt to the unlocked position thereby allowing the swing door to be moved toward the open position.

15. The cargo container door lock assembly according to claim 14, wherein said hollow housing and said locking bolt have cooperating instrumentalities for limiting linear travel of said locking bolt relative to said hollow housing.

16. The cargo container door lock assembly according to claim 14, wherein a spring is arranged in operable combination with and for positively urging said locking bolt toward the locked position.

17. The cargo container door lock assembly according to claim 14, wherein said locking bolt has a camming head configuration at a free end thereof.

18. The cargo container door lock assembly according to claim 14, further including an actuator carried by said hollow sill between said upper and lower frame pieces for moving said locking bolt to the unlocked position in response to said protrusion passing upwardly through the lower opening in said frame piece of said sill.

19. The cargo container door lock assembly according to claim 18, further including structure for limiting access to said actuator carried between the upper and lower flanges of said hollow sill.

20. In combination with a chassis trailer configured to support a cargo container thereon, said cargo container having a swinging door movable between open and closed positions and relative to a cargo container frame with top, bottom frame members rigidly joined to each other by side frame members to define a generally rectangular opening which is at least partially closed when said door is in the closed position, and with the bottom frame member having upper and lower generally parallel and horizontal flanges joined to each other by a vertical flange, with the lower flange of said bottom frame member defining a lowermost engaging surface for said container, with said chassis trailer having a protrusion extendable upwardly from a cargo container supporting surface thereon, and a door lock assembly including a resiliently biased door locking member movable between locked and unlocked positions, with said door locking member being mounted to an interior surface on said swinging door for sliding movement along an axis extending generally normal to the upper flange of said bottom frame member, and with the upper and lower flanges of said bottom frame member defining upper and lower vertically spaced and generally aligned openings, respectively, and wherein a lower end of said door locking member passes through the upper opening defined by said upper flange of said bottom frame member when said swinging door is in the closed position, and with a closed margin of the upper opening defined by said upper flange preventing the door, with the resiliently biased door locking member mounted thereon, from moving toward an open position until the container is positioned to allow the protrusion on said chassis trailer to pass through the lower opening in the lower flange of the bottom frame member whereby operably moving the door locking member to the unlocked position thereby allowing the swing door to be moved toward the open position.

21. The combination according to claim 20 further including an actuator carried by said bottom frame member between said upper and lower flanges for moving said door locking member to the unlocked position in response to said protrusion passing upwardly through the lower opening in the lower flange of said bottom frame member.

22. The combination according to claim 20, wherein said door lock assembly further includes a mounting bracket for said door locking member, and with said mounting bracket and said door locking member having cooperating instrumentalities for limiting linear travel of said door locking member relative to said bracket between locked and unlocked positions.

23. The combination according to claim 20, wherein a spring is arranged in operable combination with and urges said door locking member toward a locked position.

24. The combination according to claim 20, wherein said door locking member has a camming head configuration toward a lower end thereof for facilitating movement of said door locking member.

* * * * *